United States Patent
Kuo et al.

(10) Patent No.: US 8,307,386 B2
(45) Date of Patent: Nov. 6, 2012

(54) OPTICAL DISC WITH THICKER SUPPORTING SECTION AND THINNER RECORDING SECTION

(75) Inventors: Chi-Pin Kuo, Hsinchu (TW); Cheng-Hsiung Chen, Hsinchu (TW)

(73) Assignee: Princo Middle East FZE, Dubai (AE)

(*) Notice: Subject to any disclaimer, the term of this patent is extended or adjusted under 35 U.S.C. 154(b) by 0 days.

(21) Appl. No.: 13/101,694

(22) Filed: May 5, 2011

(65) Prior Publication Data

US 2011/0314484 A1 Dec. 22, 2011

(30) Foreign Application Priority Data

Jun. 21, 2010 (TW) .............................. 99120119 A

(51) Int. Cl.
*G11B 7/24* (2006.01)
(52) U.S. Cl. ........................................ 720/721
(58) Field of Classification Search .................... 720/721
See application file for complete search history.

(56) References Cited

U.S. PATENT DOCUMENTS

| 6,461,711 | B1 | 10/2002 | Ishida et al. |
| 7,027,385 | B1 | 4/2006 | Shimazaki et al. |
| 7,688,694 | B2 | 3/2010 | Chuang et al. |
| 2006/0245340 | A1 | 11/2006 | Chu |
| 2007/0098948 | A1 | 5/2007 | Yang et al. |
| 2009/0053454 | A1* | 2/2009 | Chiu et al. ................... 428/64.4 |

FOREIGN PATENT DOCUMENTS

| TW | I267847 | 12/2006 |
| TW | 200910342 | 3/2009 |
| TW | I322417 | 3/2010 |

* cited by examiner

*Primary Examiner* — Mark Blouin
(74) *Attorney, Agent, or Firm* — Pai Patent & Trademark Law Firm; Chao-Chang David Pai

(57) ABSTRACT

An optical disc of a thicker supporting section and a thinner recording section is characterized by: a reinforcement section of a predetermined width which overlaps a supporting section and a recording section. With the reinforcement section, the structure of the optical disc is strengthened, and the resonant frequency of the optical disc is raised, so that the vibration of the optical disc is suppressed and the disc is suitable for high speed (16× up) reading/writing. The optical disc comprises: a circular opening disposed in the center of the optical disc; an annular recording section; an annular supporting section disposed between the annular recording section and the circular opening, wherein the annular supporting section is thicker than the annular recording section; and an annular reinforcement section which is disposed on one of the two sides of the optical disc and overlaps the annular supporting section and the annular recording section.

12 Claims, 8 Drawing Sheets

OPTICAL DISC WITH THICKER SUPPORTING SECTION AND THINNER RECORDING SECTION

CROSS REFERENCE TO RELATED APPLICATIONS

This application claims priority from Taiwan Patent Application No. 99120119 filed on Jun. 21, 2010, the contents of which are hereby incorporated by reference in their entirety for all purposes.

BACKGROUND OF THE INVENTION

1. Technical Field

The present invention relates to an optical disc. Particularly, the present invention relates to an optical disc with a thicker supporting section and a thinner recording section.

2. Description of the Prior Art

Optical discs, which are the most convenient storage media in the latest generation of optical storage market, can be used for storing data in various formats. They are broadly applicable in the fields of, for example, library archives, data backup, electronic publication, image data storage and personal medical record management.

Since the demand for the speed of data transmission is increasing, the effort is made on improving the reading/writing speed of optical disks. In the past, the rotating speed used was mostly not high, so issues due to high-speed rotation were usually ignored. However, under high-speed reading/writing, the deformation of the optical disc and the vibration during rotation become problems to which attention should be paid. The common sources of vibration of optical discs include, for example, air disturbance or poor balance of the optical disc itself.

In order to prevent optical discs from deforming under high-speed rotation, a conventional optical disc having a compensation sheet attached to the substrate is provided. In such configuration, it is necessary for the compensation sheet to be aligned with the substrate before being attached thereto. Thus, the complexity and difficulty of the process for manufacturing optical discs increase, and so does the material cost of the compensation sheet. In view of this, Taiwanese Patent No. 1267847 has disclosed an optical disc (hereinafter, Patent Disc 1), in which the thickness of the superimposed supporting section and protruding section is greater than that of the recording section, so that Patent Disc 1 can be directly held by an optical disc drive. Thus, an additional compensation sheet as that in the conventional optical disc is not necessarily provided to thicken the optical disc for facilitating the holding of the optical disc drive. This can result in a reduced cost for manufacturing optical discs. However, the problems of deformation and vibration as shown in FIG. 1 are more likely to occur during operation. In FIG. 1, the structural strength of an optical disc 10 (represented by lines) itself is insufficient. As the optical disc rotates, since the resonant frequency thereof is too low, vibration indicated by the vertical arrow happens easily, resulting in difficulties in the focusing of the laser read/write head. In order to solve the problem of vibrations of optical discs, several techniques such as those described below have been developed for reinforcing the structure of optical discs.

Taiwanese Patent No. 1322417 has disclosed an optical disc (hereinafter, Patent Disc 2), in which the included damping layer can reduce the vibration affecting time of the optical disc, thereby resolving reading/writing problems due to vibrations at various speeds resulting from insufficient thickness or rigidity.

Nevertheless, since the recording portion of the annular substrate of Patent Disc 2 is thin (e.g. between 0.55 mm and 0.65 mm), as the coating layer and/or the damping layer attached to the recording portion contract during the optical disc manufacturing process due to the material properties thereof, the recording portion of the annular substrate becomes warped and deformed toward the side where the coating layer and the damping layer are disposed, which may cause the optical disc to lose its capability of being read/written. Therefore, to solve this problem, Taiwanese Patent No. 200910342 provides a read-only or writable DVD optical disc with thick supporting section and thin recording section (hereinafter, Patent Disc 3), which comprises a reinforced structure for reducing vibrations, and a rectification layer for rectifying disc deviation in fabricating process.

By comparing the abovementioned conventional optical discs, Patent Disc 1 is advantageous in material-saving and requiring no attachment, while it can only be used for a lower reading/writing speed ranging from 1× speed (maximum: 1500 rpm approx.) to 4× speed (maximum: 6000 rpm approx.); the reading/writing speed of Patent Disc 2 and Patent Disc 3 meets the requirement for more than 16× speed (9300 rpm approx.), while the defects such as greater material requirement and complex fabricating process still exist therein.

SUMMARY OF THE INVENTION

The object of the present invention is to solve the problem of high fabricating cost and complex fabricating process of the conventional optical disc that can be read/written at higher than 16× speed.

For the problems mentioned above, the present invention provides an optical disc, comprising: a circular opening disposed in the center of the optical disc; an annular recording section for recording information; an annular supporting section disposed between the annular recording section and the circular opening and used for supporting the optical disc, wherein the annular supporting section is thicker than the annular recording section; and an annular reinforcement section which is disposed on one of the two sides of the optical disc and overlaps the annular supporting section and the annular recording section for reinforcing the structure of the optical disc.

The present invention not only can reduce the manufacturing cost for optical discs, but also can effectively suppress the vibration during the reading/writing of optical discs, so that the reading/writing characteristics of optical discs can be improved, and it can be assured that optical discs can be read/written at the maximum speed thereof without fault in high-speed optical disc drives.

DETAILED DESCRIPTION OF THE PREFERRED EMBODIMENTS

The optical disc of the present invention will be described in the following with reference to the accompanying drawings.

Figure 1:
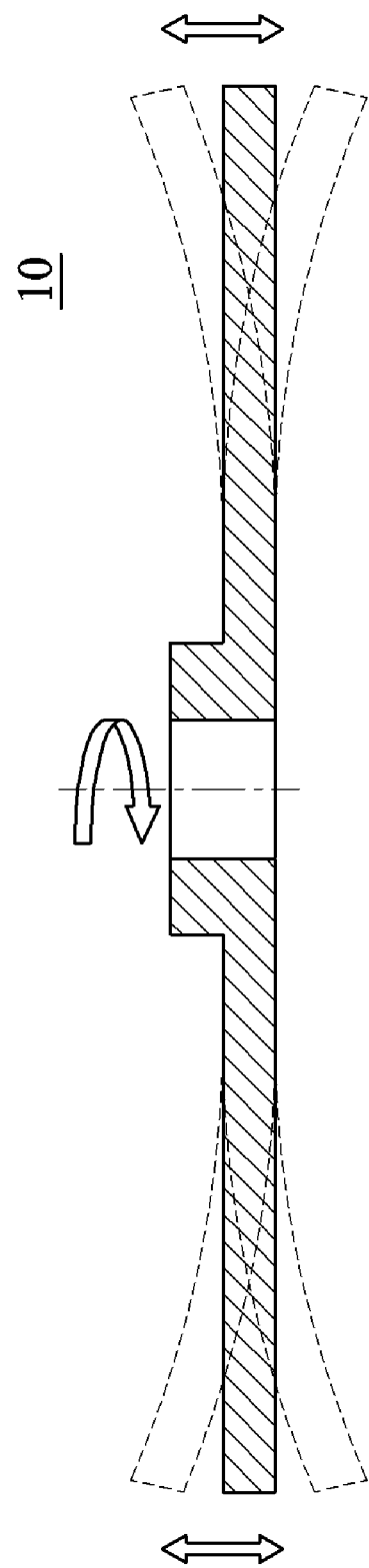
FIG. 1 is a schematic cross-sectional view showing the vibration of a conventional optical disc under high reading speed.
Figure 2A:
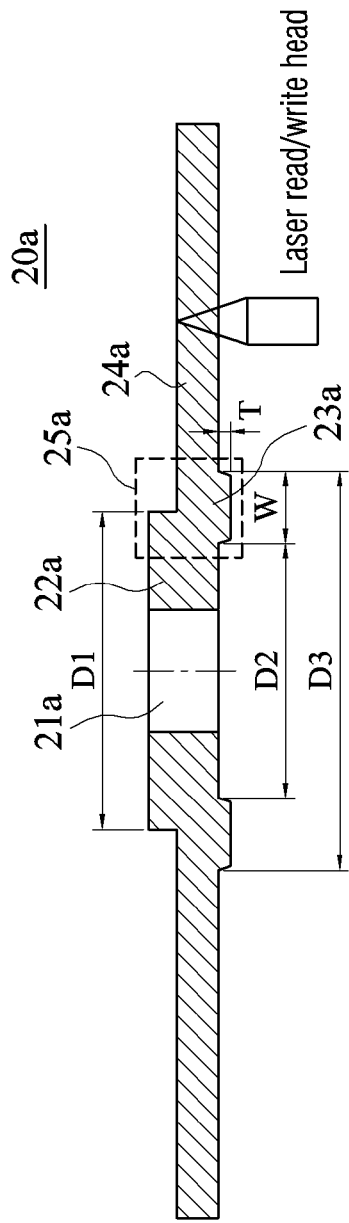
FIGS. 2A and 2B are cross-sectional views of an optical disc according to an embodiment of the present invention.
Figure 2B:
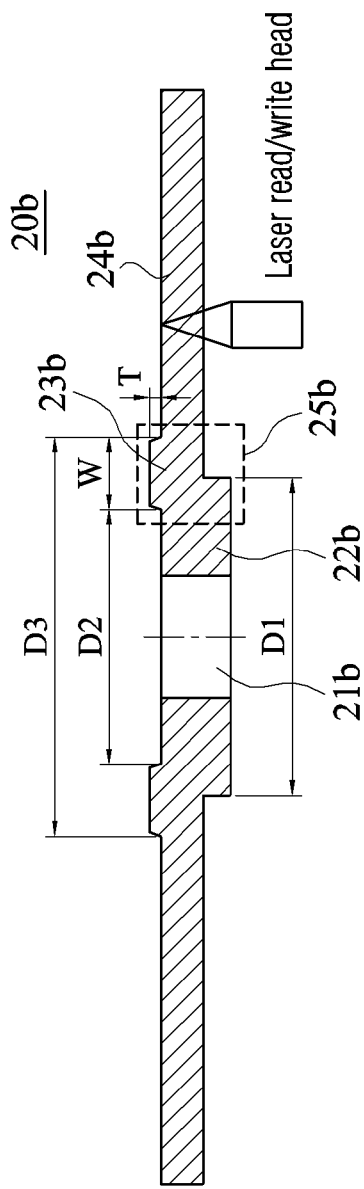

FIGS. 2A and 2B are cross-sectional views for two aspects of the optical disc of the present invention. As shown in FIGS. 2A and 2B, an annular reinforcement section 23a/23b with a predetermined width is provided on a side of an optical disc 20a/20b having a circular opening 21a/21b. In the embodiments, one of the two sides of an annular supporting section 22a/22b is approximately at the same level as one of the two sides of an annular recording section 24a/24b (i.e. the height difference thereof is within the range of ±0.1 mm), while the annular reinforcement section 23a/23b protrudes from said level. A reinforcement area 25a/25b for reinforcing the structure is formed by making the inner circumference and the outer periphery of the annular reinforcement section 23a/23b respectively overlap the annular supporting section 22a/22b and the annular recording section 24a/24b. Thus, the resonance frequencies of the optical disc 20a/20b can be raised for suppressing vibrations.

The structural strength of the optical disc can be determined with its resonance frequency, i.e. the higher the resonance frequency, the less vibration the optical disc. The resonance frequency may be calculated with computer software. The following Tables 1-5 summarize the relationship between the resonance frequency and the thickness or width of the annular reinforcement section 23 for the optical disc as shown in FIG. 2A or 2B, wherein D1 is the outer diameter of the annular supporting section, D2 is the inner diameter of the annular reinforcement section, D3 is the outer diameter of the annular reinforcement section, T is the thickness of the annular reinforcement section, and W is the width of the annular reinforcement section. In Tables 1-5, the condition of T=0 or W=0 means no annular reinforcement section is provided. By referring to FIG. 2A or 2B, the following equations (1)-(3) can be derived:

$$W=(D3-D2)/2 \quad (1)$$

$$\text{Overlapped width of the annular reinforcement section and the annular supporting section} = (D1-D2)/2 \quad (2)$$

$$\text{Overlapped width of the annular reinforcement section and the annular recording section} = (D3-D1)/2 \quad (3)$$

TABLE 1

D1 = 30 mm, D2 = 29 mm, W = 2 mm

| | Thickness of Annular Reinforcement Section (mm) | | | |
|---|---|---|---|---|
| | 0 | 0.1 | 0.2 | 0.6 |
| First Resonance Frequency (Hz) | 64.4 | 65.5 | 66.1 | 66.8 |
| Second Resonance Frequency (Hz) | 73.5 | 74.3 | 74.8 | 75.4 |

Figure 3:
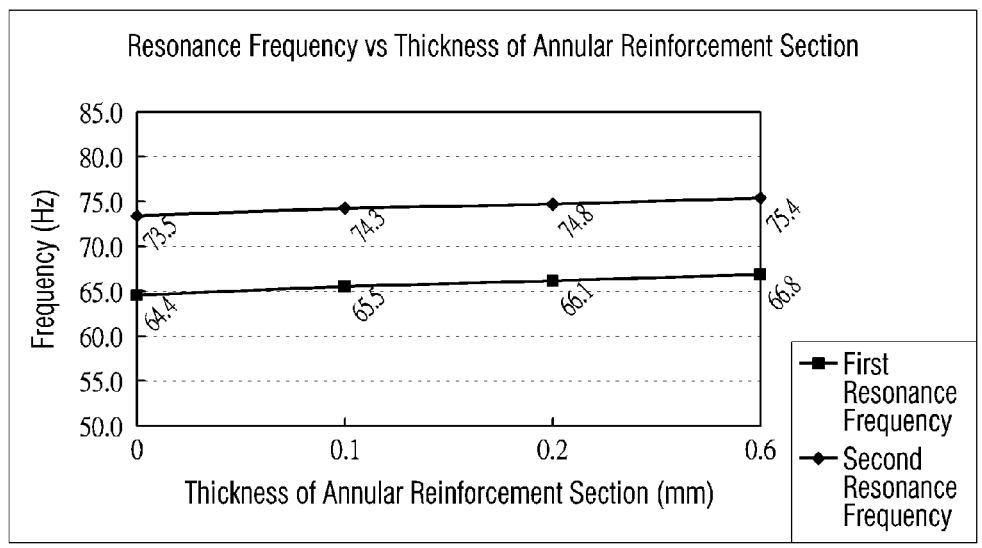
FIG. 3 shows the relationship between the resonance frequency and the thickness of the annular reinforcement section according to Table 1.

Table 1 and FIG. 3 illustrate the relationship between the resonance frequency and the thickness T of the annular reinforcement section for the optical disc with a thicker inner ring and a thinner outer ring (D1=30 mm, D2=29 mm and W=2 mm). In FIG. 3, the horizontal axis represents the thickness T of the annular reinforcement section, and the vertical axis represents the resonance frequencies of the optical discs. The thickness T of the annular reinforcement section for test is selected at 0 mm, 0.1 mm, 0.2 mm and 0.6 mm. It can be derived from the abovementioned specification of the optical disc that the overlapped width of the annular reinforcement section and the annular supporting section is 0.5 mm, and the overlapped width of the annular reinforcement section and the annular recording section is 1.5 mm. In FIG. 3, the square symbol represents the measured first resonance frequency (the lowest resonance frequency), and the diamond symbol represents the measured second resonance frequency (the second lowest resonance frequency) of the optical disc. It can be recognized from Table 1 and FIG. 3 that the thickness T of the annular reinforcement section ranging from 0.1 mm-0.6 mm has an effect of raising resonance frequency. Furthermore, within that range, the greater the thickness of the annular reinforcement section is, the higher the resonance frequency of the optical disc is achieved.

TABLE 2

D1 = 30 mm, D2 = 29 mm, T = 0.2 mm

| | Width of Annular Reinforcement Section (mm) | | | |
|---|---|---|---|---|
| | 0 | 2 | 3 | 6 |
| First Resonance Frequency (Hz) | 64.4 | 66.1 | 67.5 | 71.4 |
| Second Resonance Frequency (Hz) | 73.5 | 74.8 | 75.7 | 78.5 |

Figure 4:
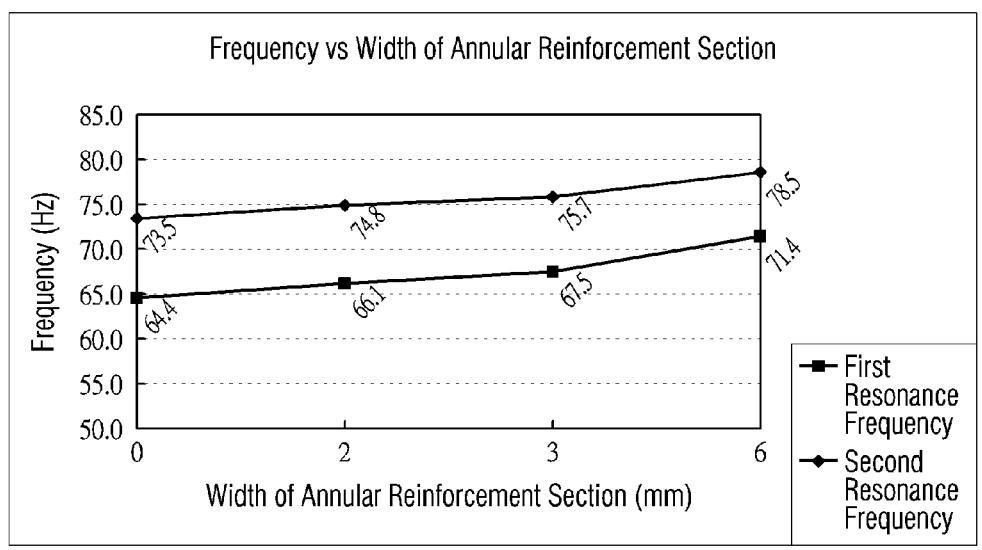
FIG. 4 shows the relationship between the resonance frequency and the width of the annular reinforcement section according to Table 2.

Table 2 and FIG. 4 illustrate the relationship between the resonance frequency and the width W of the annular reinforcement section for the optical disc, wherein D1=30 mm, D2=29 mm and T=0.2 mm. In FIG. 4, the horizontal axis represents the width W of the annular reinforcement section, the vertical axis represents the resonance frequency of the optical disc, and the width W of the annular reinforcement section for test is selected at 0 mm, 2 mm, 3 mm and 6 mm. It can be derived from the abovementioned specification of the optical disc that the overlapped width of the annular reinforcement section and the annular supporting section is 0.5 mm, and the overlapped widths of the annular reinforcement sections and the annular recording section are respectively 0 mm, 1.5 mm, 2.5 mm and 5.5 mm. As defined above, the square symbol and the diamond symbol in FIG. 4 respectively designate the measured first resonance frequency and the measured second resonance frequency of the optical disc according to Table 2. As shown in Table 2 and FIG. 4, the width W of the annular reinforcement section ranging from 2 mm-6 mm has an effect of raising resonance frequency. Additionally, within that range, the greater the width of the annular reinforcement section, the higher the resonance frequency of the optical disc.

TABLE 3

D1 = 35 mm, D2 = 34 mm, W = 2 mm

| | Thickness of Annular Reinforcement Section (mm) | | | |
| --- | --- | --- | --- | --- |
| | 0 | 0.1 | 0.2 | 0.6 |
| First Resonance Frequency (Hz) | 68.8 | 71.1 | 71.9 | 72.8 |
| Second Resonance Frequency (Hz) | 77.2 | 78.9 | 79.5 | 80.3 |

Figure 5:
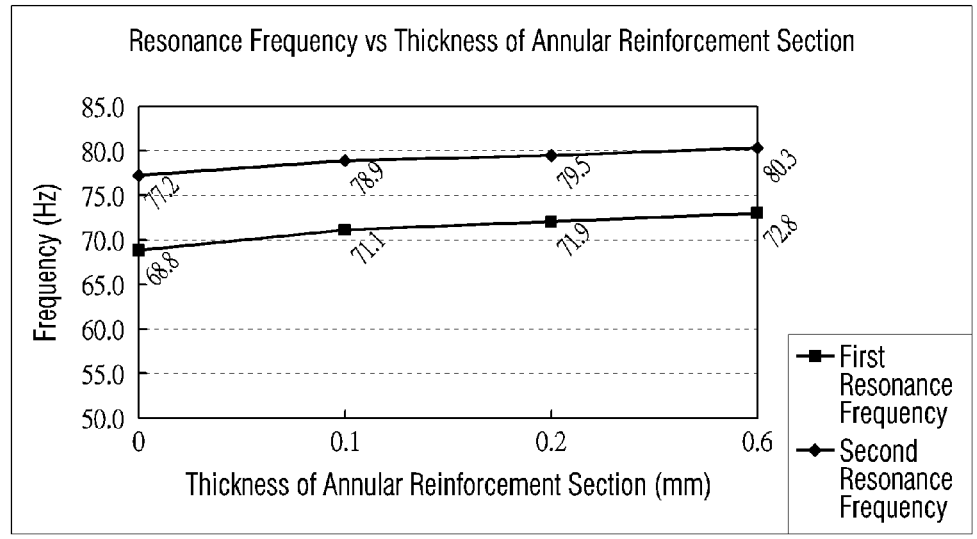
FIG. 5 shows the relationship between the resonance frequency and the thickness of the annular reinforcement section according to Table 3.

Table 3 and FIG. 5 illustrate the relationship between the resonance frequency and the thickness T of the annular reinforcement section for the optical disc of which D1=35 mm, D2=34 mm and W=2 mm. In FIG. 5, the horizontal axis represents the thickness T of the annular reinforcement section, the vertical axis represents the resonance frequency of the optical disc, and the thickness T of the annular reinforcement section for test is also selected at 0 mm, 0.1 mm, 0.2 mm and 0.6 mm as is used for Table 1 and FIG. 3 above. It can be derived from the abovementioned specification of the optical disc that the overlapped width of the annular reinforcement section and the annular supporting section is 0.5 mm, and the overlapped width of the annular reinforcement section and the annular recording section is 1.5 mm. In FIG. 5, the square symbol and the diamond respectively designate the measured first resonance frequency and second resonance frequency of the optical disc. It can be recognized from Table 3 and FIG. 5 that the thickness T of the annular reinforcement section ranging from 0.1 mm-0.6 mm has an effect of raising resonance frequency. In addition, within that range, the thicker the annular reinforcement section, the higher the resonance frequencies of the optical disc.

TABLE 4

D1 = 35 mm, D2 = 34 mm, T = 0.2 mm

| | Width of Annular Reinforcement Section (mm) | | | |
| --- | --- | --- | --- | --- |
| | 0 | 2 | 3 | 6 |
| First Resonance Frequency (Hz) | 68.8 | 71.9 | 73.4 | 77.9 |
| Second Resonance Frequency (Hz) | 77.2 | 79.5 | 80.6 | 83.8 |

Figure 6:
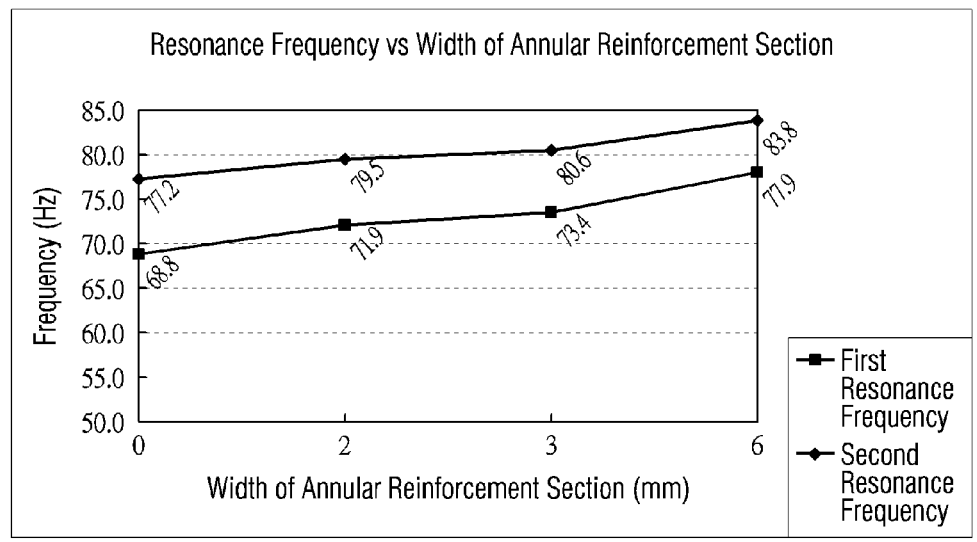
FIG. 6 shows the relationship between the resonance frequency and the width of the annular reinforcement section according to Table 4.

Table 4 and FIG. 6 illustrate the relationship between the resonance frequency and the width W of the annular reinforcement section for the optical disc, of which D1=35 mm, D2=34 mm and T=0.2 mm. In FIG. 6, the horizontal axis represents the width W of the annular reinforcement section, the vertical axis represents the resonance frequencies of the optical disc, and the width W of the annular reinforcement section for test is selected at 0 mm, 2 mm, 3 mm and 6 mm as is used for Table 2 and FIG. 4 above. It can be derived from the above-mentioned specification of the optical disc that the overlapped width of the annular reinforcement section and the annular supporting section is 0.5 mm, and the overlapped widths of the annular reinforcement sections and the annular recording section are respectively 0 mm, 1.5 mm, 2.5 mm and 5.5 mm. In FIG. 6, the square symbol and the diamond symbol respectively designate the measured first resonance frequency and measured second resonance frequency of the optical disc. As shown in Table 4 and FIG. 6, the width W of the annular reinforcement section ranging from 2 mm-6 mm also has an effect of raising resonance frequency. Additionally, within that range, the greater the width of the annular reinforcement section, the higher the resonance frequency of the optical disc.

TABLE 5

D1 = 40 mm, D3 = 41 mm, T = 0.2 mm

| | Width of Annular Reinforcement Section (mm) | | | |
| --- | --- | --- | --- | --- |
| | 0 | 1 | 3.5 | 6.5 |
| First Resonance Frequency (Hz) | 75.1 | 76.0 | 77.2 | 77.9 |
| Second Resonance Frequency (Hz) | 82.4 | 83.2 | 84.5 | 84.9 |

Figure 7:
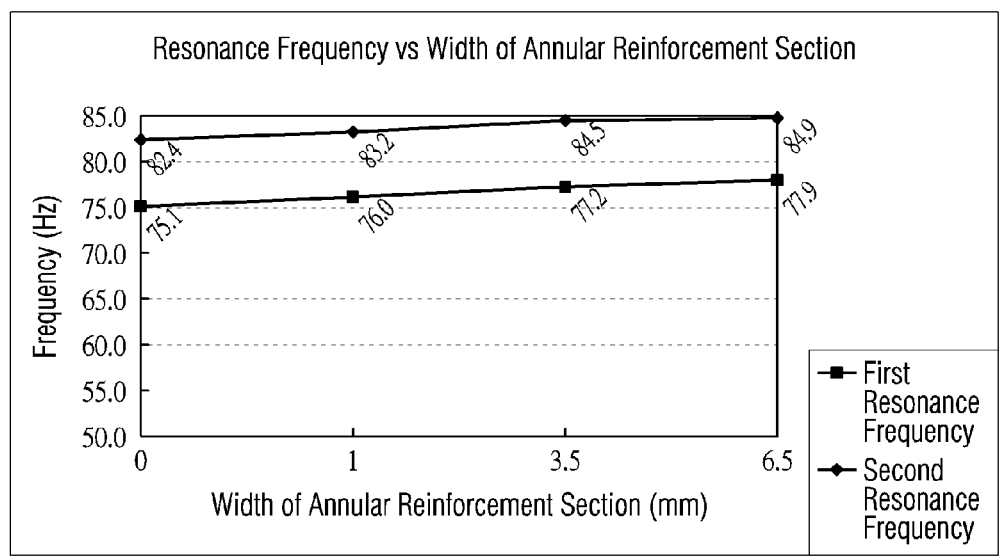
FIG. 7 shows the relationship between the resonance frequency and the width of the annular reinforcement section according to Table 5.

Table 5 and FIG. 7 illustrate the relationship between resonance frequencies and the width W of the annular reinforcement section for optical discs of which D1=40 mm, D3=41 mm and T=0.2 mm. In FIG. 7, the horizontal axis represents the width W of the annular reinforcement section, the vertical axis represents the resonance frequencies of the optical disc, and the widths W of the annular reinforcement section for test are respectively set at 0 mm, 1 mm, 3.5 mm and 6.5 mm. It can be derived from the abovementioned specification of the optical disc that the overlapped widths of the annular reinforcement section and the annular supporting section are respectively 0 mm, 0.5 mm, 3 mm and 6 mm; and the overlapped width of the annular reinforcement section and the annular recording section is 0.5 mm. In FIG. 7, the square symbol and the diamond symbol respectively represent the measured first resonance frequency and measured second resonance frequencies of the optical disc. As shown in Table 5 and FIG. 7, the width W of the annular reinforcement section ranging from 1 mm-6.5 mm raises resonance frequencies. Furthermore, within that range, the greater the width of the annular reinforcement section, the higher the resonance frequency of the optical disc.

It can be derived from the results of Tables 1-5 and FIGS. 3-7 that, for various dimensions (D1, D2 or D3) of the optical disc, the resonance frequency of the optical disc is raised when the thickness or width of the annular reinforcement section is increased.

In addition, during the injection molding process, if the shapes for adjacent portions of a mold cavity in an optical disc mold diverge greatly, when the plastic material enters into the thinner recording region from the thicker supporting region, uneven cooling and shrinking of the plastic material will be more likely to occur, resulting in the deformation of the substrate. Furthermore, the uneven shrinkage also causes residual stress at inner tracks of the substrate to be higher than that at the other parts of the substrate. Higher local residual stress not only causes the deformation of the optical disc but also initiates damages. Therefore, referring back to FIG.

2A/2B, the annular reinforcement section 23a/23b disposed between the annular supporting section 22a/22b and the annular recording section 24a/24b helps reduce the problems of deformation and residual stress concentration.

The principle of birefringence may be employed for analyzing the stress distribution in an object. "Birefringence" (i.e., "double refraction") is the phenomenon that light is refracted into one (faster) ray traveling at a larger velocity and the other (slower) ray traveling at a smaller velocity when passing through certain types of transparent materials. For polymer materials, the optical anisotropy (different optical polarizations in different directions) is mainly responsible for the birefringence. Thus, as the spatial molecular orientations are inconsistent, the degrees of birefringence will be different. The larger the deflection magnitude due to birefringence, the greater the strain at the position where measurement is made. Further, the stress can be quantified from the strain using the following equation:

$$\sigma = E\epsilon \quad (4)$$

where σ is the stress, E is the modulus of elasticity of the object, and ϵ is strain. It can be inferred from equation (4) that a linear relationship exists between the stress and the strain, thus obviously a greater strain contributes to a greater stress for a given object. Therefore, in order to compare the inner stress distributions of the optical discs with/without an annular reinforcement section, the birefringence technique can be employed for analyzing the inner stress distribution of the optical disc.

Figure 8:
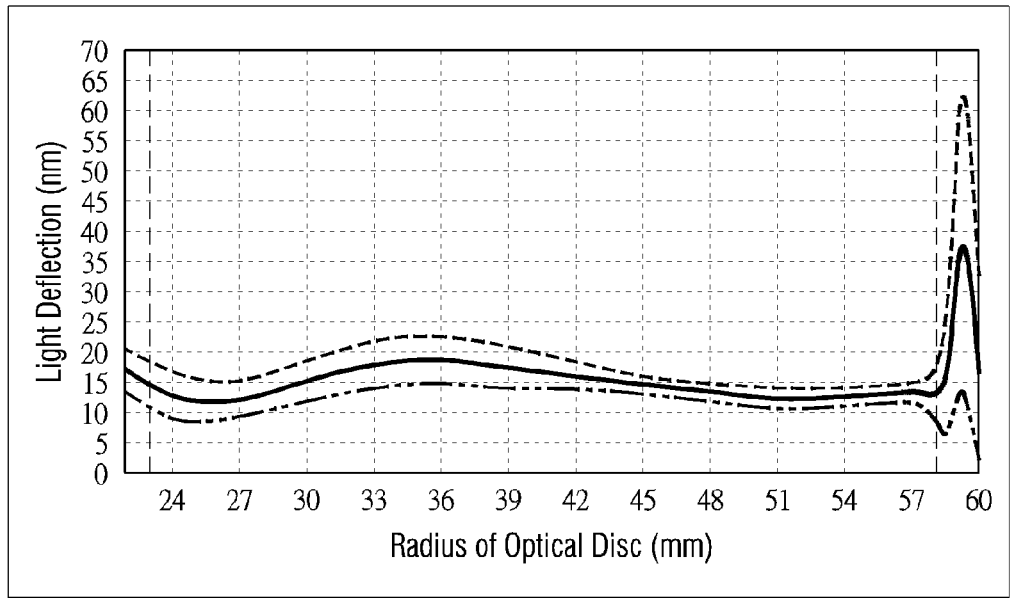
FIG. 8 is a birefringence distribution chart of an optical disc with annular reinforcement section.

FIG. 8 illustrates the birefringence distribution chart of an optical disc with an annular reinforcement section, in which the horizontal axis represents the radius of the optical disc, and the vertical axis represents the quantity of light deflection. In the embodiment, the dimensions of the optical disc are D1=35 mm, D2=34 mm, W=2 mm, and T=0.2 mm. In FIG. 8, the dashed lines denote the measured quantity of light deflection, the solid line denotes an average of the two dashed lines, while the recording section in the portion of the optical disc having a radius within the range of two vertical boundary lines on both sides of the graph is provided with tracks.

Figure 9:
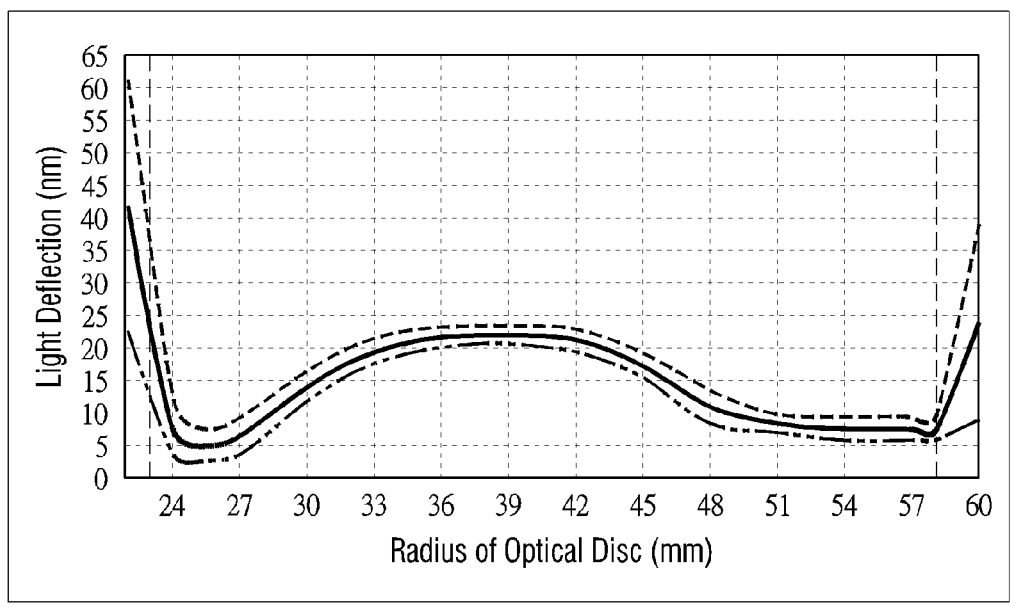
FIG. 9 is a birefringence distribution chart of an optical disc without annular reinforcement section.

FIG. 9 illustrates the birefringence distribution chart of an optical disc without an annular reinforcement section, in which the horizontal axis represents the radius of the optical disc, and the vertical axis represents the quantity of light deflection. The dimensions of the optical disc are set at D1=35 mm and T=0 mm. As defined above, in FIG. 9, the dashed lines denote the measured quantity of light deflection, the solid line denotes the average values of the two dashed lines. Also, the range of radius between the two vertical boundary lines on both sides of the graph corresponds to the portion of the optical disc in which the recording section is provided with tracks.

By comparing FIG. 8 with FIG. 9, it can be seen that in the region of the optical disc where the recording section is provided with tracks, the curves in FIG. 8 run more smoothly, although the quantity of light deflection can be kept below the upper specification limit 50 nm throughout in both cases. Particularly, within the inner track region where the radius of the optical disc is between 20-24 mm, the average of light deflection in FIG. 8 fluctuates less acutely than in FIG. 9 (10 nm-20 nm vs. 5 nm-45 nm), while the stress distributions in other parts of both optical discs are relatively close. In other words, disposing the annular reinforcement section can reduce not only the stress itself but also the stress fluctuation at the inner track regions.

Additionally, the degree of deformation of the optical disc is related to the quality thereof. Specifically, it is easier for the read/write head to track and focus on an optical disc with a relatively small degree of deformation, i.e., with a better quality. Therefore, in the following, the degree of deformation is measured for the optical discs with/without an annular reinforcement section respectively and the results are compared, so as to further understand the influence of disposing the annular reinforcement section on the deformation of the optical discs.

Figure 10:
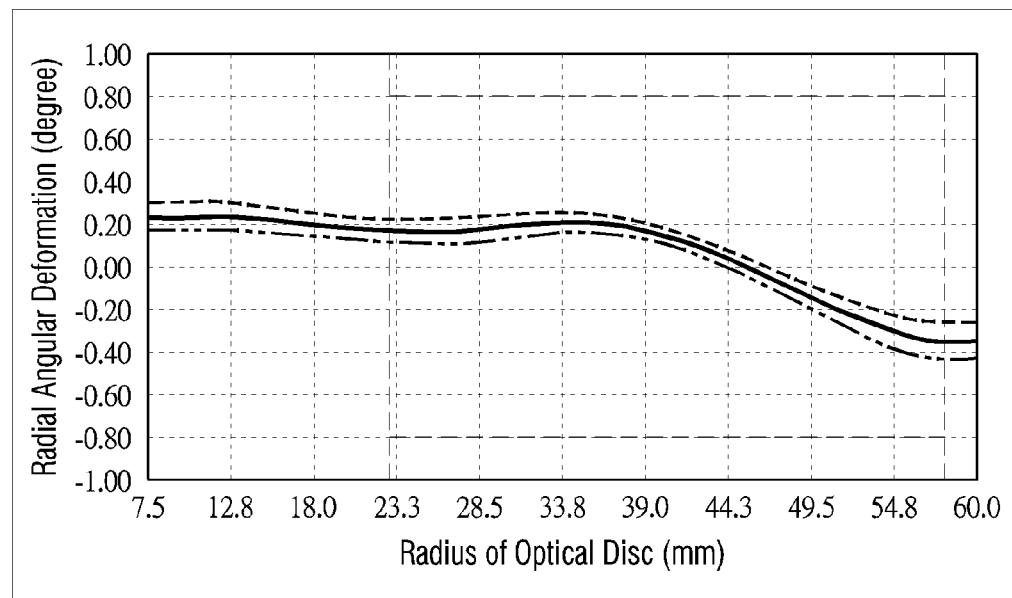
FIG. 10 shows radial angular deformation of an optical disc with annular reinforcement section.

FIG. 10 shows the radial angular deformation of the optical disc with annular reinforcement section, wherein the horizontal axis represents the radius of the optical disc, and the vertical axis represents the radial angular deformation in degree. In the embodiment, the dimension of the optical disc is D1=35 mm, D2=34 mm, W=2 mm, and T=0.2 mm. In FIG. 10, the recording section in the portion of the optical disc having a radius within the range between the two vertical boundary lines is provided with tracks. Besides, the two horizontal dashed lines respectively represent the upper specification limit)(+0.8° and lower specification limit (−0.8°, and the bold curve represents the averages of the degrees of the radial angular deformation.

Figure 11:
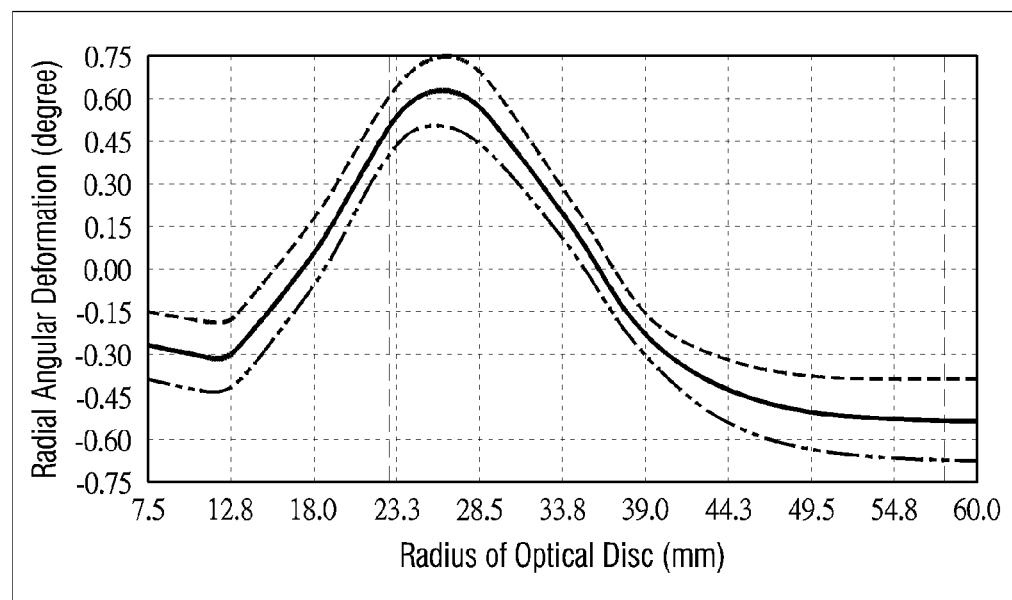
FIG. 11 shows radial angular deformation of an optical disc without annular reinforcement section.

FIG. 11 shows the radial angular deformation of the optical disc without annular reinforcement section, wherein the horizontal and vertical axes respectively represent the radius of the optical disc and the radial angular deformation in degree. In this embodiment, the dimension of the optical disc is: D1=35 mm, and T=0 mm. In FIG. 11, as defined above, the range of radius between the two vertical boundary lines on both sides of the graph corresponds to the portion of the optical disc in which the recording section is provided with tracks. Also, the upper and lower specification limits, not shown in FIG. 11, are the same as those in FIG. 10 (+0.8° and −0.8° respectively), and the bold curve represents the average of the degrees of the radial angular deformation.

By comparing FIG. 10 with FIG. 11, it can be seen that the curves in FIG. 10 run more smoothly, and in the inner track region (where a radius of the optical disc ranges from 20 to 24 mm), the radial angular deformation behaves very differently. In comparison, the radial angular deformation is smaller in FIG. 10 (between +0.1° and +0.3° than in FIG. 11 (between −0.45° and)+0.75°. Thus, the annular reinforcement section does produce the effect of suppressing radial deformation.

TABLE 6

|  | Speed of Optical Drive (rpm) | | | | | |
| --- | --- | --- | --- | --- | --- | --- |
|  | 7000 | 8000 | 9000 | 10000 | 11000 | 12000 |
| Disc 1 (Pieces of full focusing and track-locking/ Total number of pieces) | 9/10 | 5/10 | 0/10 | 0/10 | 0/10 | 0/10 |
| Disc 2 (Pieces of full focusing and track-locking/Total number of pieces) | 10/10 | 10/10 | 10/10 | 9/10 | 1/10 | 0/10 |

Disc 1   D1 = 35 mm, no annular reinforcement section
　　　　First resonance frequency: 68.8 Hz,
　　　　Second resonance frequency: 77.2 Hz
Disc 2   D1 = 35 mm, D2 = 30 mm, W = 4 mm, T = 0.2 mm
　　　　First resonance frequency: 72.4 Hz,
　　　　Second resonance frequency: 80.3 Hz In order to understand the relationship between the disposition of reinforcement section and the maximum revolution at which the optical disc can still be read/written without fault, the optical discs with and without the annular reinforcement section (hereinafter, Disc 1 and Disc 2) are used for comparing the reading/writing under the same speed. The factors for determining whether an optical disc is readable/writable are "focusing" and "track locking" (locked at a designated track). Disc 1 is an optical disc without an annular reinforcement section, and the outer diameter of the annular supporting section D1 is 35 mm; Disc 2 is an optical disc provided with an annular reinforcement section, wherein D1=35 mm, D2=30 mm, W=4 mm, and T=0.2 mm. 10 pieces of Disc 1 and 10 pieces of Disc 2 are tested by the optical drive PIONEER DVR-116D, and the conditions and results for the test are shown in Table 6. It can be derived from Table 6 that under the high revolution rate of 9000 rpm (16× speed), Disc 1 is completely unable to be successfully focused and locked at a specific track, while Disc 2 can still achieve a full focusing and track locking. Therefore, under a raised revolution, the annular reinforcement section has an effect of facilitating focusing and track locking.

Although the present invention does not limit the method for forming the annular reinforcement section, it is preferred to integrate the annular reinforcement section with the optical disc, so that the manufacturing process of optical discs can be further simplified. For example, a mold cavity of the annular reinforcement can be disposed in the mold, so that the optical disc is provided with an annular reinforcement section as injection-molded.

Figure 12:
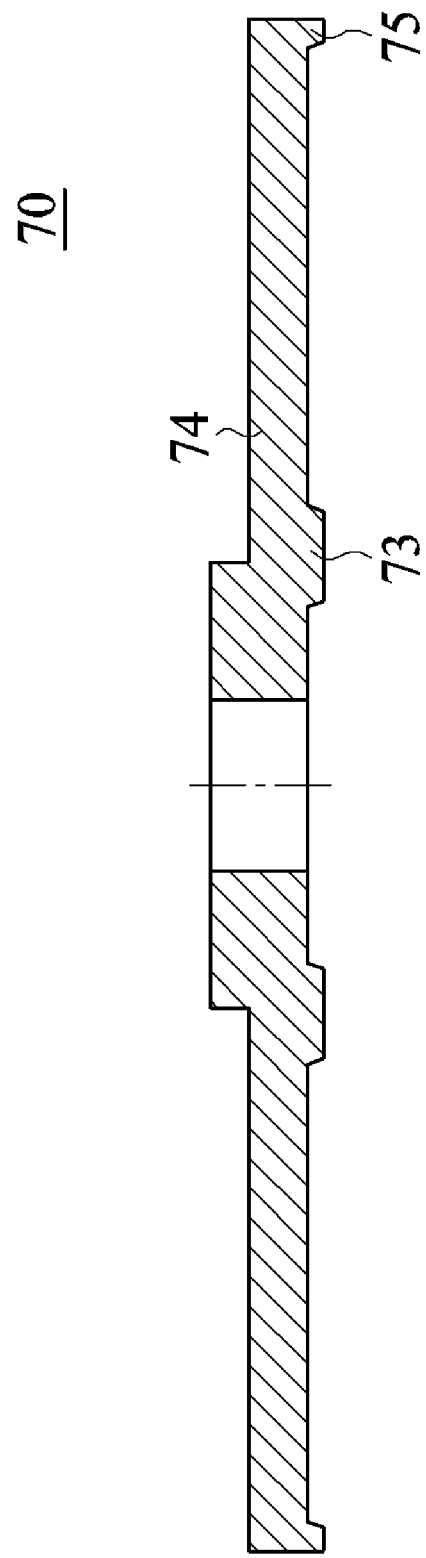
FIG. 12 is a cross-sectional view of an optical disc with a flange disposed at the periphery of the annular recording section.

Besides, FIG. 12 also shows the optical disc according to a modified embodiment of the present invention. In addition to the aforementioned annular reinforcement section 73 for structural strengthening, a protruding section 75 is disposed on the periphery of the annular recording section 74. When the disc is placed on a plane surface, the annular reinforcement section 73 and the protruding section 75 can prevent the annular recoding section from directly contacting the plane surface. Moreover, when the optical disc is picked up or placed by hand, the protruding section 75 can prevent fingers from contacting the optical disc, so that scratches or fingerprints can be avoided.

Although it has been confirmed through experiments that the present invention produces the effect of raising the resonance frequencies of optical discs, for further improving the effect of suppressing vibrations, one or more layers of vibration-suppressing/absorbing structure can be disposed on the recording section of the optical disc of a modification according to an embodiment of the present invention. For example, the damping layer disclosed by the aforementioned TW 1322417 can be used as a vibration-suppressing material and attached to the optical disc of the present invention.

While the technical features of the invention have been described in terms of several preferred exemplary embodiments, it is made for exemplifying but not limiting. In other words, without departing from the true spirit and novel teachings of the present invention, those skilled in the art may produce a variety of alterations and modifications in the scope of the appended claims below.

What is claimed is:

1. An optical disc, comprising:
a circular opening disposed in the center of the optical disc;
an annular recording section for recording information;
an annular supporting section disposed between the annular recording section and the circular opening, wherein the annular supporting section is thicker than the annular recording section, and one side of the annular supporting section and one side of the annular recording section are substantially coplanar; and
an annular reinforcement section which is disposed on and protrudes from the one side of the annular supporting section and the one side of the annular recording section that are substantially coplanar, and overlaps with a portion of the annular supporting section and a portion of the annular recording section.

2. The optical disc of claim 1, wherein the width of the annular reinforcement section is between 1 mm and 6.5 mm, and the thickness of the annular reinforcement section is between 0.1 mm and 0.6 mm.

3. The optical disc of claim 2, wherein the overlapping width of the annular reinforcement section and the annular supporting section is between 0.5 mm and 6 mm.

4. The optical disc of claim 2, wherein the overlapping width of the annular reinforcement section and the annular recording section is between 0.5 mm and 5.5 mm.

5. The optical disc of claim 1, wherein
the inner diameter of the annular reinforcement section is smaller than the outer diameter of the annular supporting section, the outer diameter of the annular reinforcement section is larger than the inner diameter of the annular recording section.

6. The optical disc of claim 5, wherein the width of the annular reinforcement section is between 1 mm and 6.5 mm, and the thickness of the annular reinforcement section is between 0.1 mm and 0.6 mm.

7. The optical disc of claim 6, wherein the overlapping width of the annular reinforcement section and the annular supporting section is between 0.5 mm and 6 mm.

8. The optical disc of claim 6, wherein the overlapping width of the annular reinforcement section and the annular recording section is between 0.5 mm and 5.5 mm.

9. The optical disc of claim 1, wherein the annular reinforcement section is one-piece formed with the annular supporting section and the annular recording section.

10. The optical disc of claim 1, wherein the annular recording section comprises one or more layers of vibration suppressing structure or vibration absorbing structure.

11. The optical disc of claim 1, wherein the outer circumference of the annular recording section comprises a protruding portion.

12. The optical disc of claim 1, wherein the optical disc is adapted to be read and written at 16× speed (9300 revolutions per minute) or higher.

* * * * *